United States Patent [19]
Purvis et al.

[11] Patent Number: 5,193,026
[45] Date of Patent: Mar. 9, 1993

[54] REFLECTIVE SAFETY STRIPES

[76] Inventors: Edward Purvis, 1714 17th St. East, Bradenton, Fla. 34208; George Spector, 233 Broadway Rm 3815, New York, N.Y. 10007

[21] Appl. No.: 767,632
[22] Filed: Sep. 30, 1991
[51] Int. Cl.⁵ ............................................. G02B 5/12
[52] U.S. Cl. ................................. 359/516; 359/517
[58] Field of Search ............... 359/515, 516, 517, 518, 359/519

[56] References Cited

U.S. PATENT DOCUMENTS

| | | | |
|---|---|---|---|
| 2,078,103 | 4/1937 | Simmons | 359/516 |
| 2,502,535 | 4/1950 | Richards | 359/519 |
| 2,656,763 | 10/1953 | Frost | 359/519 |
| 2,737,851 | 3/1956 | Buchholtz | 359/517 |
| 3,038,381 | 6/1962 | Jones | 359/518 |
| 3,849,804 | 11/1974 | Rakow | 359/518 |
| 3,994,560 | 11/1976 | Rice | 359/516 |
| 4,601,538 | 7/1986 | Valkenburg | 359/519 |
| 4,653,853 | 3/1987 | Bedford | 359/519 |

Primary Examiner—Loha Ben

[57] ABSTRACT

A reflective safety device is provided which consists of an article made of light reflecting material worn on a person at night, so that the person can be seen by the lights of a motor vehicle to prevent accidents.

1 Claim, 1 Drawing Sheet

U.S. Patent  Mar. 9, 1993  5,193,026
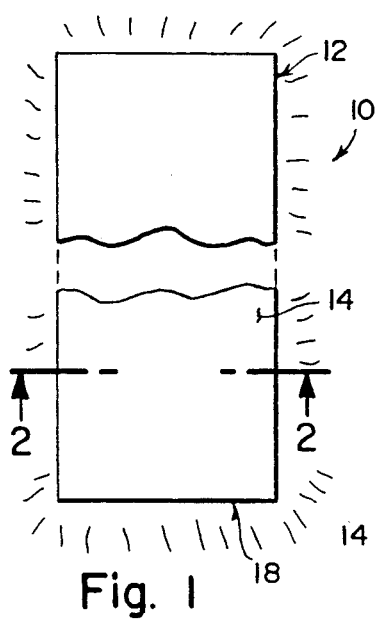
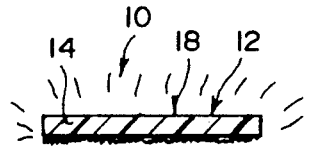
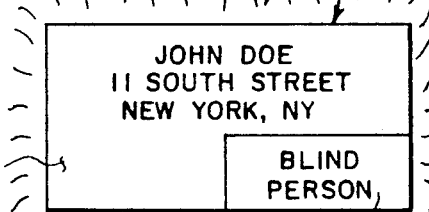
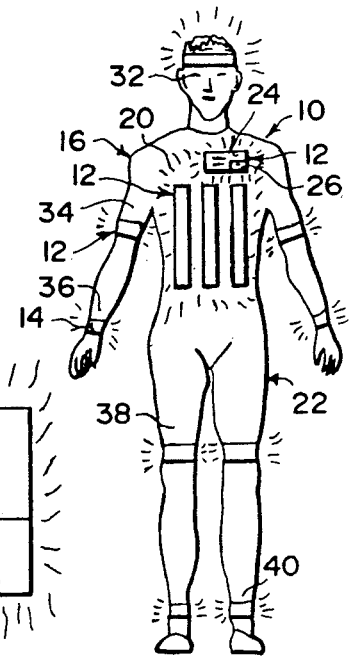
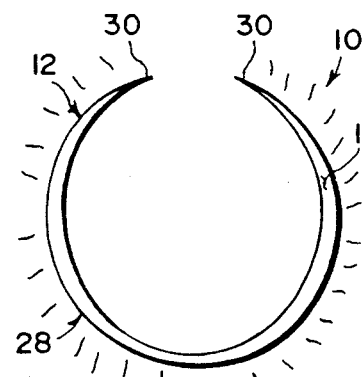
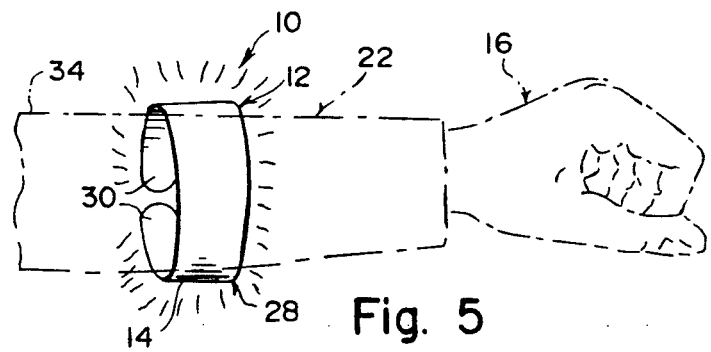
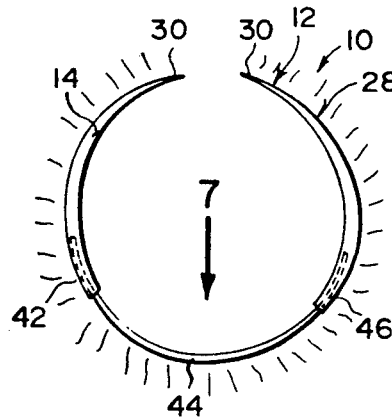
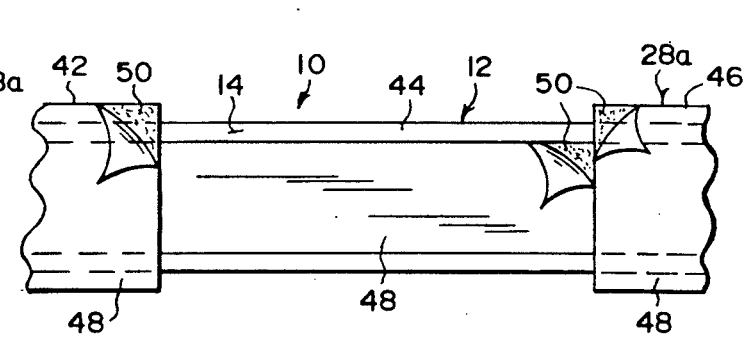

REFLECTIVE SAFETY STRIPES

BACKGROUND OF THE INVENTION

The instant invention relates generally to luminescent signaling devices and more specifically it relates to a reflective safety device which provides light reflecting material worn on a person at night, so that the person can be seen.

There are available various conventional luminescent signaling devices which do not provide the novel improvements of the invention herein disclosed.

SUMMARY OF THE INVENTION

A primary object of the present invention is to provide a reflective safety device that will overcome the shortcomings of the prior art devices.

Another object is to provide a reflective safety device which can be an adhesive strip, a band or a name and address plate made of light reflecting material worn on a person at night, so that the person can be seen by the lights of a motor vehicle.

An additional object is to provide a reflective safety device in which the band can be of an adjustable type so that it can be worn on various sized parts of the body of the person, such as the head, arms and legs.

A further object is to provide a reflective safety device that is simple and easy to use.

A still further object is to provide a reflective safety device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a top view with parts broken away of the instant invention being a reflective adhesive strip.

FIG. 2 is a cross sectional view taken along line 2—2 in FIG. 1, showing the adhesive on back of the strip.

FIG. 3 is a top view of the instant invention being a reflective name and address identification plate.

FIG. 4 is an end view of the instant invention being a reflective C-shaped band.

FIG. 5 is a perspective view of the reflective C-shaped band worn about an arm of a person in phantom.

FIG. 6 is an end view of a modified reflective C-shaped band which is adjustable.

FIG. 7 is a view taken in direction of arrow 7 in FIG. 6, showing the adhesive, peel away covering and the telescopic adjustment structure in greater detail.

FIG. 8 is a front view of a person wearing the various items of the instant invention.

DETAILED DESCRIPTION OF THE PREFERRED EMBODIMENTS

Turning now descriptively to the drawings, in which similar reference characters denote similar elements throughout the several views, the Figures illustrate a reflective safety device 10, which comprises an article 12 made of light reflecting material 14 worn on a person 16 at night, so that the person 16 can be seen by the lights of a motor vehicle to prevent accidents.

As shown in FIGS. 1, 2 and 8, the article 12 of light reflecting material 14 is a flexible adhesive strip 18 being of a bright color which can stick onto a body area 20 of a garment 22 worn by the person 16.

As shown in FIGS. 3 and 8, the article 12 of light reflecting material 14, is a name and address identification plate 24 with a handicap indication area 26 thereon being of a bright color which can be attached by adhesive or the like onto a body area 20 of a garment 22 worn by the person 16.

As shown in FIGS. 4, 5 and 8, the article 12 of light reflecting material 14 is a C-shaped band 28 having tapered ends 30, being of a bright color and which can be worn on a head 32 of the person 16, on an arm 34, wrist 36, leg 38 or ankle 40 of a garment 22 worn by the person 16.

As shown in FIGS. 6 and 7, the C-shaped band 28a is adjustable and includes telescopic segments 42, 44 and 46 with peel away coverings 48 to expose adhesive rear surfaces 50, so that the adjustable C-shaped band 28a can be better worn on various sized parts of the extremities of the person 16.

A person 16 walking or running at night will only have to apply the reflective safety device 10 to various parts of their body and garments. Light will reflect therefrom, so that approaching motor vehicle headlights will illuminate the articles 12, the reflective flexible adhesive strip 18 can also be useful as a marker for a mail box and other objects that need to be seen at night by drivers of motor vehicles.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A reflective safety device which comprises an article made of light reflecting material worn on a person at night, so that the person can be seen by the lights of a motor vehicle to prevent accidents, wherein said article of light reflecting material is a C-shaped band having tapered ends, being of a bright color and which can be worn on a head of the person, on an arm, wrist, leg or ankle of a garment worn by the person, and wherein said C-shaped band is adjustable and includes telescopic segments with peel away coverings to expose adhesive rear surfaces, so that said adjustable C-shaped band can be better worn on various sized parts of the extremities of the person.

* * * * *